June 12, 1956     R. B. WOODBURY     2,750,558

PULSE TUBE TEST APPARATUS

Filed Jan. 10, 1946

INVENTOR
ROGER B. WOODBURY
BY *m.c.Hayes*
ATTORNEY

United States Patent Office 2,750,558
Patented June 12, 1956

2,750,558

PULSE TUBE TEST APPARATUS

Roger B. Woodbury, Boston, Mass., assignor, by mesne assignments, to the United States of America as represented by the Secretary of the Navy Application January 10, 1946, Serial No. 640,279

14 Claims. (Cl. 324—26)

This invention relates to apparatus for testing electron tubes, and more particularly, to apparatus for determining the operating characteristics of electron tubes under conditions of high electrode currents.

Many applications of electron tubes require the application of comparatively high potentials across the electrodes for a short period of time causing very high currents to flow through the tube.

The determination of the operating characteristics of tubes under such conditions is often a laborous process. To avoid exceeding the maximum power dissipation limit of the tubes under test, previous methods have involved the application of high amplitude voltage pulses to the tube through a suitable resistor connected in series with the tube and the pulse source, and measurement of the voltages on the source and tube side of the resistor with a cathode ray oscilloscope. The electrode current is then determined by computing the current flowing through the resistor from the known resistance and the difference in voltage on each side of the resistor. Since a number of tubes of each type must be tested to determine the average characteristics, such a procedure is too time-consuming to be practicable for production testing.

It is an object of this invention to provide a means for determining rapidly the operating characteristics of an electron tube.

It is a further object of this invention to provide a means for indicating continuously the electrode potentials and currents of an electron tube when a series of pulses is impressed across said electrodes.

These and other objects will be more apparent upon consideration of the following description and the accompanying drawings, in which.

Figure 1:
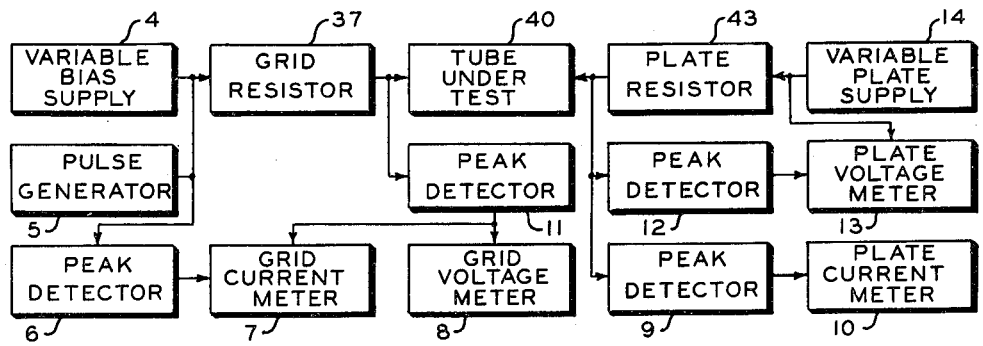
Fig. 1 is a functional block diagram of an embodiment of this invention.

The operation of the apparatus is readily apparent upon consideration of Fig. 1. The electron tube under test 40 has applied to its plate through a suitable plate resistor 43 a positive potential supplied by the variable plate supply 14. The grid of tube 40 is biased through a suitable grid resistor 37 to a selected potential with respect to its cathode, preferably below plate current cut-off, by a variable bias supply 4. A pulse generator 5 impresses a series of short duration positive voltage pulses upon the grid of tube 40 through resistor 37, causing the tube to draw grid current through the resistor. The difference between the output of peak detector 6, which has its input connected to the output of pulse generator 5, and the output of peak detector 11, which has its input connected to the grid of tube 40, is proportional to the peak grid current flowing through resistor 37 and is indicated by the grid current meter 7. The output of peak detector 11 is proportional to the peak grid voltage and is indicated by the grid voltage meter 8.

The change in grid potential of tube 40 during the pulse causes the tube to draw plate current from plate supply 14 through the plate resistor 43. The peak voltage drop appearing across resistor 43 during the pulse is impressed upon the input terminals of peak detectors 9 and 12. This peak voltage drop is indicated directly by the plate current meter 10 which is connected to the output of peak detector 9. The output of peak detector 12 is subtracted from the output of plate supply 14 by the plate voltage meter 13, which indicates the peak plate voltage during the pulse.

Figure 2:
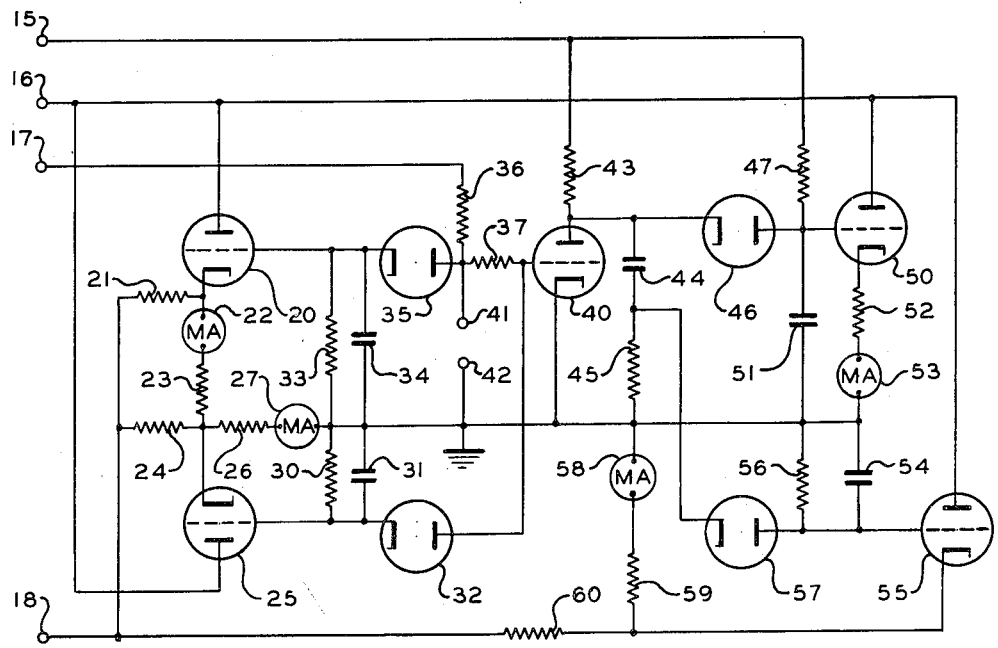
Fig. 2 is a schematic diagram of an embodiment of this invention.

With reference to Fig. 2, a complete schematic diagram of the embodiment shown in general form in Fig. 1, is shown. Corresponding circuit components are similarly designated in all accompanying figures. A positive potential of known and adjustable amplitude, applied between terminal 15 and common ground, is impressed upon the plate of the vacuum tube 40 under test through a suitable plate resistor 43. A negative potential of known and adjustable amplitude, applied between terminal 17 and ground, is impressed upon the grid of tube 40 through an isolating resistor 36 and a suitable grid resistor 37. The desired operating point for the tube under test is selected by adjustment of these parameters. A series of positive voltage pulses, supplied by a pulse generator (not shown) is applied between terminals 41 and 42. The grid of tube 40 is thus driven to a positive potential with respect to its cathode for a very short period of time during each pulse, causing grid current to flow through the grid resistor 37, which preferably has a low resistance of approximately 100 ohms. Isolating resistor 36 prevents the short circuiting of the pulse generator by the negative bias supply.

A conventional peak detector, comprising a diode rectifier 35, a load resistor 33 and a filter capacitor 34 is connected across terminals 41 and 42 to produce an output voltage across load resistor 33 which is proportional to the peak amplitude of the applied voltage pulses. A similar peak detector, comprising a diode rectifier 32, a load resistor 30, and a filter capacitor 31 is connected between the grid of tube 40 and ground to produce an output voltage across load resistor 30 which is proportional to the peak grid voltage. The peak amplitude of the grid voltage is the difference between the peak amplitude of the applied voltage pulse and the peak voltage drop produced by the flow of grid current through grid resistor 37.

Figure 3:
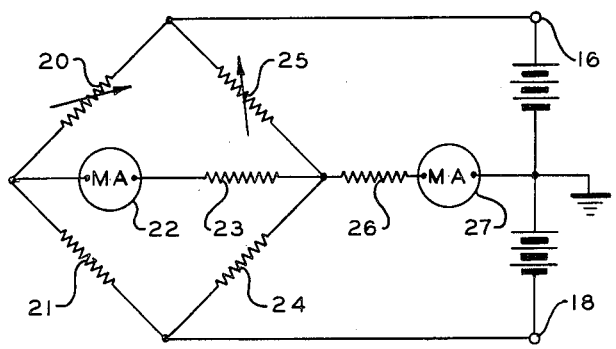
Fig. 3 is a simplified equivalent circuit of a bridge shown in detail in Fig. 2.

Fig. 3 shows a simplified equivalent circuit of a bridge, shown in detail in the circuit of Fig. 2, which comprises two variable resistors 20 and 25 and two fixed resistors 21 and 24. Variable resistors numbered 20 and 25 are the equivalent static plate resistances of tubes 20 and 25, respectively, shown in Fig. 2.

The plate resistance of tube 25 (Fig. 2) is controlled by the voltage drop appearing across load resistor 30, connected between the grid of tube 25 and ground while that of tube 20 is controlled by the voltage drop appearing across load resistor 33, connected between the grid of tube 20 and ground. The plate resistance of tube 25 is thus a function of the peak grid voltage of tube 40 and the plate resistance of tube 20 is a function of the peak amplitude of the input voltage pulse applied between terminals 41 and 42.

Resistors 21 and 24 are each connected at one end to terminal 18, which is biased to a negative potential with respect to ground by means of an external voltage source connected between terminal 18 and ground and indicated by a battery in Fig. 3. By the selection of the correct resistance of resistor 24, in accordance with the well-known bridge circuit theory, the potential difference between the cathode of tube 25 and ground can be made equal to zero in the absence of an input pulse. A first moving coil direct current instrument 27 and a suitable calibrating resistor 26, usually having a very high resistance compared with that of resistor 24, are connected in series between the cathode of tube 25 and ground. Since the plate resistance of tube 25 and hence the current flowing through resistor 24 is a function of the voltage applied to the grid of tube 40, instrument 27 can be calibrated to indicate directly the peak amplitude of the voltage applied to the grid of tube 40.

The voltage drop appearing across resistor 21 is likewise a function of the plate resistance of tube 20, which in turn is a function of the peak amplitude of the input voltage pulse. A second moving coil direct current instrument 22 connected in series with a suitable calibrating resistor 23 between the cathode of tube 20 and the cathode of tube 25 can be calibrated to indicate directly the grid current drawn by tube 40 during the pulse, since the grid current is proportional to the difference between the amplitudes of the input voltage pulse and the grid voltage of tube 40.

A third peak detector comprising a diode rectifier tube 46, a filter capacitor 51 and a load resistor 47 is connected to the plate of tube 40. Resistor 47 is connected between the grid of a direct current amplifier tube 50 and a terminal 15, to which is connected the variable plate supply (not shown) for tube 40. A third moving coil direct current instrument 53, in series with a suitable load resistor 52, is connected between the cathode of tube 50 and ground. Instrument 53 indicates the space current of tube 50, which is proportional to the voltage drop appearing across capacitor 51. Since resistor 47 is connected to the positive plate supply terminal 15, the grid assumes, in the absence of an input pulse, a positive potential equal to that between terminal 15 and ground. However, during the period of time when the grid of tube 40 is positive, the voltage drop produced by the flow of plate current through resistor 43 is impressed upon capacitor 51 through tube 46, causing a decrease in the space current flowing through tube 50. Instrument 53 thus can be calibrated to indicate directly the peak plate voltage of tube 40.

A fourth peak detector, comprising a diode rectifier tube 57, load resistors 45 and 56 and a filter capacitor 54 is coupled to the plate of tube 40 through a coupling capacitor 44. Capacitor 54 and resistor 56 are connected in parallel between the grid of a direct current amplifier tube 55 and ground. A load resistor 60 is connected between the cathode of tube 55 and terminal 18, which is connected to a source of negative potential (not shown). A fourth moving coil direct current instrument 58, in series with a suitable calibrating resistor 59, is connected between the cathode of tube 55 and ground. In operation, the peak voltage drop appearing across plate resistor 43 during the application of the positive pulse to the grid of tube 40 is coupled through capacitor 44 and rectifier tube 57 to the grid of tube 55, causing a change in the plate current of tube 55 which is proportional to the plate current drawn by tube 40. Instrument 58 thus can be calibrated to indicate directly the peak plate current drawn by tube 40 during the pulse.

Since certain changes may be made in the above described apparatus and different embodiments of the invention could be made without departing from the scope thereof, it is intended that all matter contained in the above description or shown in the accompanying drawings, shall be interpreted as illustrative and not in a limiting sense and, therefore, that the invention is to be limited only by the prior art and the spirit of the appended claims.

What is claimed is:

1. Apparatus for determining the characteristics of an electron discharge device comprising, means for impressing across the electrodes of said electron discharge device a series of short-duration voltage pulses, means for measuring the amplitude of said voltage pulses, and means for measuring the electrode currents flowing in said electron discharge device during the period of application of said pulses.

2. Apparatus for determining the characteristics of an electron discharge device under conditions of comparatively high electrode currents comprising, means for applying a plurality of fixed potentials to said device, means for impressing upon the electrodes of said device a series of short duration voltage pulses, said high electrode currents flowing during the period of application of said voltage pulses, means for indicating continuously the peak amplitude of said voltage pulses, and means for indicating continuously the peak amplitudes of said electrode currents.

3. Apparatus for determining the characteristics of an electron tube, said tube having at least a cathode, an anode and a grid, said apparatus comprising, a grid resistor having one terminal connected to said grid, a variable bias supply potential source coupled to said grid through said grid resistor, a plate resistor, a variable plate supply potential source coupled to said plate through said plate resistor, said cathode being connected to a point of fixed potential, means for impressing short duration voltage pulses between said point of fixed potential and the other terminal of said grid resistor, a first peak detector energized by said short-duration pulses, a second peak detector energized by the grid voltage of said tube, means responsive to said second peak detector for indicating continuously the peak amplitude of the voltage pulses at said grid, and means responsive to said first peak detector and said second peak detector for continuously indicating the peak amplitude of the current through said grid resistor.

4. Apparatus of claim 3 and a third peak detector coupled to said plate, a fourth peak detector coupled to said plate, means responsive to said variable plate supply potential and to said third peak detector for indicating continuously the peak amplitude of plate voltage, and means responsive to the output of said fourth peak detector for indicating continuously the peak amplitude of the plate current.

5. Apparatus for determining the characteristics of an electron tube having at least a grid, a plate and a cathode, said apparatus comprising, means coupling said cathode to a point of reference potential, a grid resistor connected at one end to said grid, a variable grid biasing potential source coupled to said grid through said grid resistor, means impressing a series of short-duration voltage pulses between said point of reference potential and the other end of said grid resistor, a plate resistor, a source of variable plate supply potential connected to said plate through said plate resistor, a first peak detector energized by said short-duration voltage pulses, a second peak detector having an input connected between said grid and said point of reference potential, first and second vacuum tubes comprising at least a grid, a cathode and an anode, the output of said first peak detector being applied between said point of reference potential and the grid of said first tube, the output of said second peak detector being applied between said point of reference potential and the grid of said second tube, a second source of variable plate supply potential, means returning said plates of said first and second tubes to said second source of variable plate supply potential, a second source of variable biasing potential, a first resistor returning said cathode of said first tube to said second variable biasing potential source, a second resistor returning said cathode of said second tube to said second variable biasing potential source, a first current meter and a first calibrating resistor serially connected between said cathodes of said first and second tubes, a second current meter and a second calibrating resistor serially connected between said point of reference potential and the cathode of said second tube, whereby the grid current drawn by the tube being tested during said pulses is indicated by said first meter, and the peak amplitude of the voltage applied to said grid of the tube being tested is indicated by said second meter.

6. Apparatus as defined in claim 5, wherein each of said first and second peak detectors comprises a diode serially connected at its cathode to a parallel resistor-capacitor circuit, the output of each peak detector appearing across its parallel resistor-capacitor circuit, the input to each of said peak detectors being applied across the series combination of said diode and said parallel resistor-capacitor circuit.

7. Apparatus of claim 5 and a third peak detector circuit coupled to the plate of the tube being tested, a direct current amplifier including an electron tube having at least a plate, a cathode and a grid, the cathode of said direct current amplifier tube being returned to said point of reference potential through a third current indicating meter and a third calibrating resistor serially connected to said third meter, the output of said third peak detector being connected between said point of reference potential and said grid of said direct current amplifier tube, said third current meter indicating the peak plate voltage of the tube being tested during the voltage pulse, a fourth peak detector circuit capacitively coupled to the plate of said tube being tested, and means responsive to the output of said fourth peak detector for indicating the peak plate current drawn by the tube being tested during an applied voltage pulse.

8. Apparatus for determining the characteristics of an electron discharge device under conditions of comparatively high electrode currents comprising, means for applying a plurality of fixed potentials to said device, means for impressing upon the electrodes of said device a series of short duration voltage pulses, said high electrode currents flowing during the period of application of said voltage pulses, means for indicating continuously the peak amplitude of said electrode currents, and means for indicating continuously the peak amplitudes of said voltage pulses, said last-mentioned means comprising, a peak detector, means for impressing said input pulses upon said peak detector, a direct current amplifier having its input connected to the output of said peak detector, and a current indicating instrument connected to the output of said amplifier.

9. Apparatus for determining the characteristics of an electron discharge device under conditions of comparatively high electrode currents comprising, means for applying a plurality of fixed potentials to said device, means for impressing upon the electrodes of said device a series of short duration voltage pulses, said high electrode currents flowing during the period of application of said voltage pulses, means for indicating continuously the peak amplitude of said voltage pulses, and means for indicating continuously the peak amplitude of one of said electrode currents comprising, a resistor energized by said short duration voltage pulses and connected to an electrode of said electron discharge device, a first peak detector, said first peak detector being energized by said short duration pulses, a first direct current amplifier having a first load resistor and having its input connected to the output of said first peak detector, a second peak detector having its input connected to said electrodes, a second direct current amplifier having a second load resistor and having its input connected to the output of said second peak detector, and a current indicating instrument connected between said first and second load resistors, said instrument indicating the difference between the space current of said first amplifier and the space current of said second amplifier, said difference being a function of the amplitude of said one high electrode current.

10. In apparatus for determining the characteristics of an electron tube having at least a control grid, a grid resistor having first and second terminals and having its first terminal connected to said grid, means for impressing short duration voltage pulses at said second terminal of said grid resistor to cause grid conduction of said tube through said grid resistor for the duration of each of said pulses, means coupled to said grid for generating a first signal proportional to the peak amplitude of the voltage pulses at said grid, means coupled to said second terminal of said grid resistor for generating a second signal proportional to the peak amplitude of said applied voltage pulses, and means responsive to said first and second signals for generating a third signal proportional to the peak amplitude of the grid current of said tube.

11. Apparatus as defined in claim 10 wherein each of said first and second signal generating means is a peak detector comprising a diode serially connected to a parallel resistor-capacitor circuit, the input to said peak detector being applied across the series combination of said diode and parallel circuit, the output of said peak detector appearing across said parallel circuit.

12. In apparatus for determining the characteristics of an electron tube having at least a control grid, a grid resistor having first and second terminals and having its first terminal connected to said control grid, means for impressing short duration voltage pulses at said second terminal of said control grid to cause grid conduction of said tube through said grid resistor for the duration of each of said applied pulses, means coupled to said control grid for generating a first signal proportional to the peak amplitude of the voltage pulses at said control grid, means for generating a second signal proportional to the peak amplitude of said applied voltage pulses, and means responsive to said first and second signals for indicating the peak amplitude of the control grid current and the peak amplitude of said pulses at said control grid.

13. In apparatus for determining the characteristics of an electron tube having at least an anode and a control grid, a grid resistor having first and second terminals and having its first terminal connected to said control grid, means for impressing short duration voltage pulses at said second terminal to cause anode and grid current flow for the duration of each of said applied pulses, means coupled to said grid for generating a first potential having an amplitude proportional to the peak amplitude of the voltage pulses at said grid, means coupled to said second terminal of said grid resistor for generating a second potential having an amplitude proportional to the peak amplitude of said applied pulses, means responsive to said first and second potentials for indicating the peak amplitudes of said grid voltage and current, means coupled to said anode for generating a third potential having an amplitude proportional to the peak amplitude of the voltage at said anode, means responsive to said third potential for indicating the peak amplitude of the voltage at said anode, means coupled to said anode for generating a fourth potential having an amplitude proportional to the peak amplitude of the anode current, and means responsive to said fourth potential for indicating the peak amplitude of said anode current.

14. Apparatus as defined in claim 13 wherein each of said first, second, third and fourth potential generating means is a peak detector comprising a diode in series with a parallel resistor-capacitor circuit, the input to said peak detector being applied across the series combination of said diode and said parallel circuit, the output of said peak detector appearing across said parallel resistor-capacitor circuit.

References Cited in the file of this patent

UNITED STATES PATENTS

| 1,718,557 | Hickok | June 25, 1929 |
| 1,854,901 | Goodwin | Apr. 19, 1932 |
| 1,954,305 | Williams | Apr. 16, 1934 |
| 2,227,381 | Rider | Dec. 31, 1940 |
| 2,399,859 | Crawley | May 7, 1946 |